US005907441A

United States Patent [19]

[11] Patent Number: 5,907,441

Sapy

[45] Date of Patent: May 25, 1999

[54] SUPPORT JACK FOR FRAGILE HEAVY STRUCTURES

[75] Inventor: Jean-Louis Sapy, Tournay, France

[73] Assignee: Giat Industries, France

[21] Appl. No.: 08/737,781

[22] PCT Filed: Mar. 25, 1996

[86] PCT No.: PCT/FR96/00439

§ 371 Date: Nov. 25, 1996

§ 102(e) Date: Nov. 25, 1996

[87] PCT Pub. No.: WO96/30965

PCT Pub. Date: Oct. 3, 1996

[30] Foreign Application Priority Data

Mar. 24, 1995 [FR] France .................................. 95.03517

[51] Int. Cl.[6] .............................. G02B 5/08; G02B 7/188

[52] U.S. Cl. .......................... 359/849; 359/850; 359/846; 359/847; 359/872

[58] Field of Search .................................... 359/849, 850, 359/851, 853, 872, 846, 847

[56] References Cited

U.S. PATENT DOCUMENTS

| | | | |
|---|---|---|---|
| 4,522,111 | 6/1985 | Kobelt | 92/48 |
| 4,750,002 | 6/1988 | Kommineni | 343/915 |
| 5,677,800 | 10/1997 | Soll et al. | 359/849 |

FOREIGN PATENT DOCUMENTS

| | | |
|---|---|---|
| 1354295 | 1/1964 | France . |
| 2559854 | 8/1985 | France . |
| 7324578 | 11/1973 | Germany . |
| 3521973 | 7/1986 | Germany . |
| 982336 | 2/1965 | United Kingdom . |
| 1382094 | 1/1975 | United Kingdom . |

OTHER PUBLICATIONS

Morrison, Development problems of the promary mirror for large space Telescope, SPIE, Journal May, 1970.

*Primary Examiner*—Cassandra Spyrou
*Assistant Examiner*—Mohammad Y. Sikder
*Attorney, Agent, or Firm*—Parkhurst & Wendel, L.L.P.

[57] ABSTRACT

A dual action support cylinder placed between a support (2) and a load (1) for applying on said load a nominal force of about 400 to 3900N for a low displacement of less than 1 cm, having a body (1) forming a vessel connected to said support (2) and closed on both sides by a cover (11, 12), said covers and body defining a housing with two chambers (32, 33), each sealed by a flexible membrane (36, 39). The two covers (11, 12) are connected to each other by connecting means (16) comprising ties (45) arranged through the body (10) and the covers (11, 12). The body (10) has a cylinder flange (30, 31) placed on either side of a core member (50) and cooperating with a collar (37, 40) for gripping the inner edge of each membrane (36, 39), wherein the movement of the cylinder is guided by metallic membranes.

13 Claims, 5 Drawing Sheets

AA

SUPPORT JACK FOR FRAGILE HEAVY STRUCTURES

FIELD OF THE INVENTION

Structures such as a telescopic mirror are large in size and require precise positioning properly to receive an image. A telescopic mirror requires a supporting structure that should distribute the pressure on the mirror as evenly as possible so as not to deform the precise convex/concave shape.

The technical field of the present invention concerns means for supporting fragile and heavy structures, such as a telescope mirror, on a receiving support.

In this kind of structure it is absolutely necessary that the heavy load rest on a means ensuring a uniform thrust adjustable by the user regardless of the position of the structure. It is known that telescope mirrors are of very large dimension, for instance 8 m in diameter, and that mirror deformations must be precisely controlled, even suppressed, while nevertheless assuring the positioning of such mirrors.

BACKGROUND OF THE INVENTION

In the prior art, there have been attempts to support and position telescopic mirrors with precision for increased accuracy.

UK 1382094 discloses a method to correct distortions measured from the surface of a radio reflector as it is moved to different angles of elevation by varying the movement of actuators after taking into account factors such as gravity and wind. However, such prior art systems require complex circuitry to correct the shape of a deformable mirror.

The object of the present invention is to provide a support jack for exerting accurate and adjustable thrust within a well-defined range on a load.

Accordingly the object of the invention is a dual-acting support jack interposed between a support and a load and able to apply to this load a rated force between approximately 400 and 3,900N over displacement of less than 1 cm. The jack includes a reservoir-forming body, connected to the support and covered on both sides by a cover, the covers and the body bounding a housing having two chambers, each sealed by a flexible membrane, the two covers being connected to each other by link means.

The link means consist of tie bolts extending through the body and the covers.

The support jack has a generally cylindrical shape with two chambers isolated one from the other.

The membranes are in the form of annuli of which the inside edge is joined to the body and the outside edge to each of the covers.

Each cover comprises a cylindrical flange cooperating with a collar to clamp the outer edge of each membrane.

The covers are joined to each other by tie bolts having at their centers a bulge, the collar and the cover being pressed by means of nuts against each side of the said bulge.

The inner and outer membrane edges are fitted with a bead disposed in a channel in each collar.

The load is linked to the adjacent cover by a linkrod.

The support jack is rigidly joined opposite the load to a means generating an additional force.

One embodiment of the support jack supporting a telescope mirror comprises an array of support jacks linked to the mirror and to a support structure matching the shape of the mirror.

The main advantage of the present invention is the accurate adjustment of the force applied by the support jack to the load.

Another advantage is the faithful transmission of the force received by the support jack.

In the telescope mirror application, one advantage of the support jack is to allow accurate mirror-weight distribution, thereby avoiding critical deformations.

Another advantage is the design of a jack with only minute rigidity-fluctuation or restoring force.

Yet another advantage is the design of a jack practically free of friction or hysteresis of any kind.

Other features and advantages of the invention are elucidated in the following complementary description illustrating a particular embodiment mode in relation to the attached drawings in which:

DESCRIPTION OF THE PREFERRED EMBODIMENT

Figure 1:
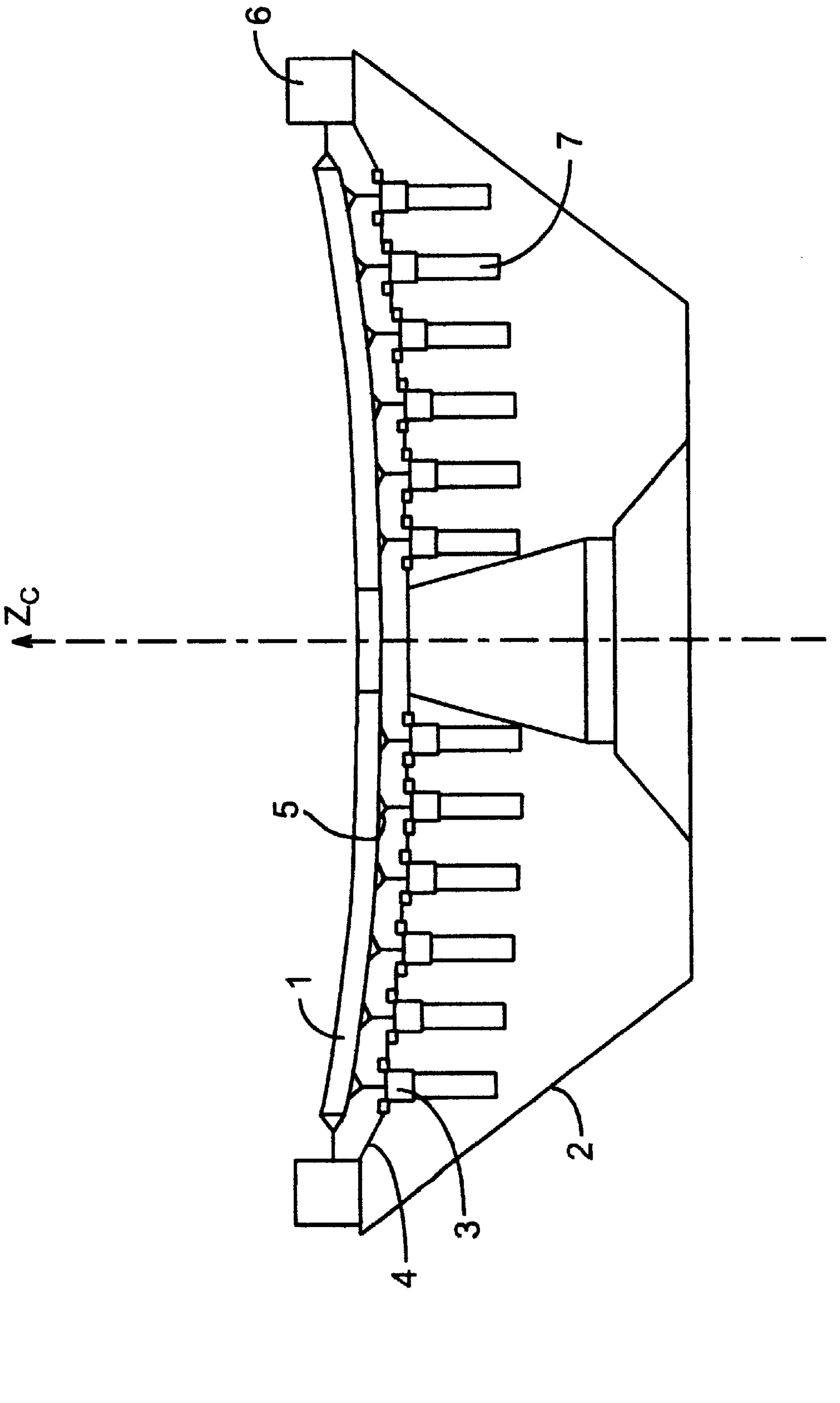
FIG. 1 is a section showing the support jack of the invention.

As shown in FIG. 1 support jack of the invention is positioned between a load, which in this instance illustratively is a very large and heavy telescope mirror of 8 m diameter, and a support 2 which in this instance a mechanically welded structure. The mirror is supported by a plurality of support jacks 3 which are linked to an upper support plate 4 of the support 2. Illustratively each jack 3 is connected to the mirror by a linkrod 5. The main feature of the jacks 3 is as explained above, to apply a spread force known at each instant between 400 and 3,900N and in particular between 500 and 1,600N. For a rated force within the latter bracket, jack stability must exceed 0.05N in one minute. The linkrods 5 are connected in known manner to the mirror 1, for instance by bonding.

The mirror 1 is also held in place along its periphery by positioning means 6 that may be identical to the support jack 3. Again a correcting force generated by another jack 7, or active jack, as described below, may be imparted to each support jack 3. Held in place in this manner, the mirror 1 may be displaced by driving the structure 2 from the zenith position in FIG. 1 to a position wherein the telescope looks at the horizon. During this displacement, the support jacks 3 and 6 hold and position the mirror by spreading its weight as harmoniously and accurately as required.

Figure 2:
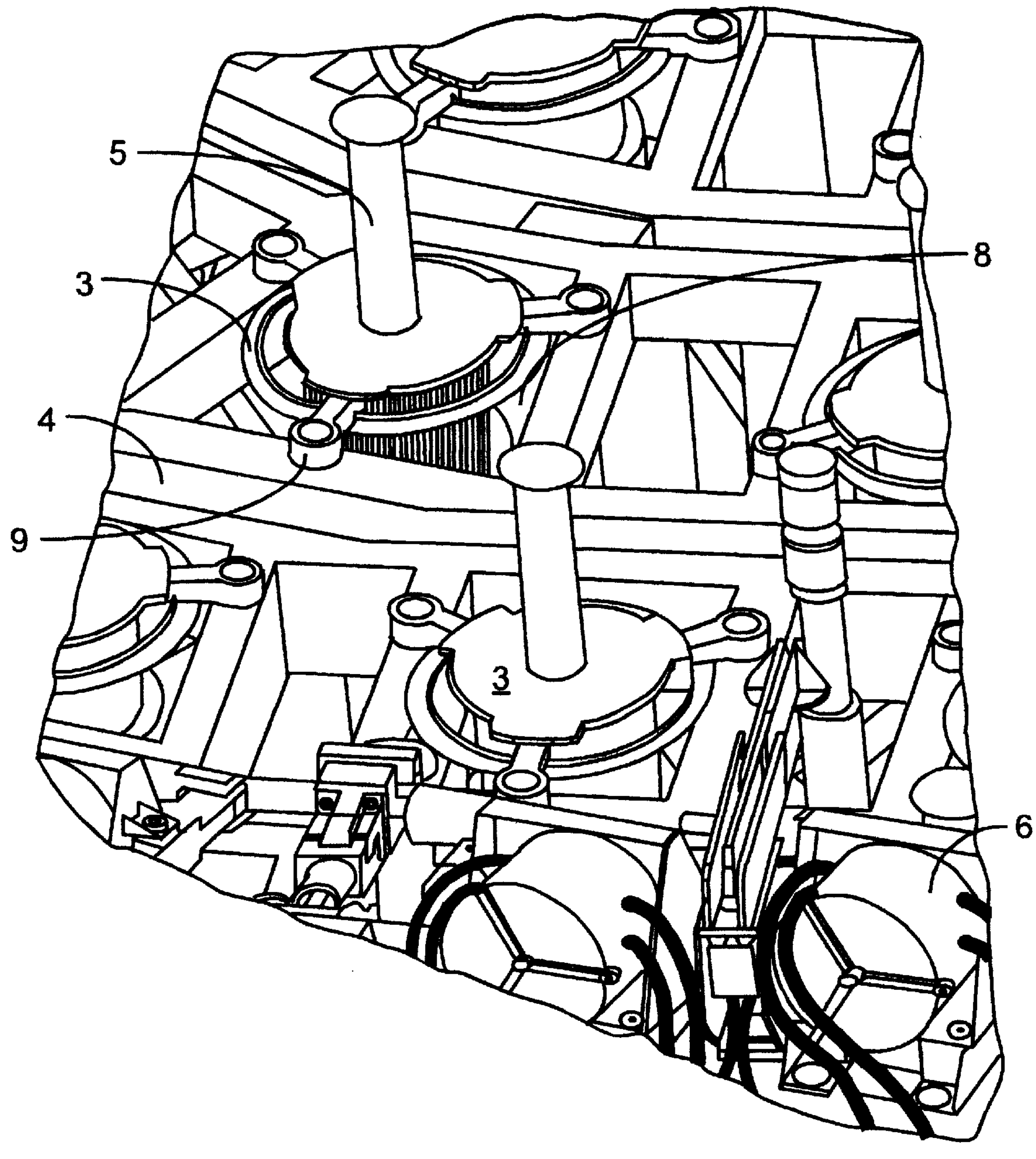
FIG. 2 is a view showing the support jack linked to its support.

FIG. 2 is a perspective top view of the jack 3 with the mirror removed. It is shown that the upper plate 4 is fitted with apertures and receives the jacks 3 regularly arrayed on this plate in cells 8. Each jack 3 comprises three affixation feet 9 which are bolted onto the plate 4. FIG. 2 also shows the positioning means 6 exerting a force on the mirror segment.

Figure 3:
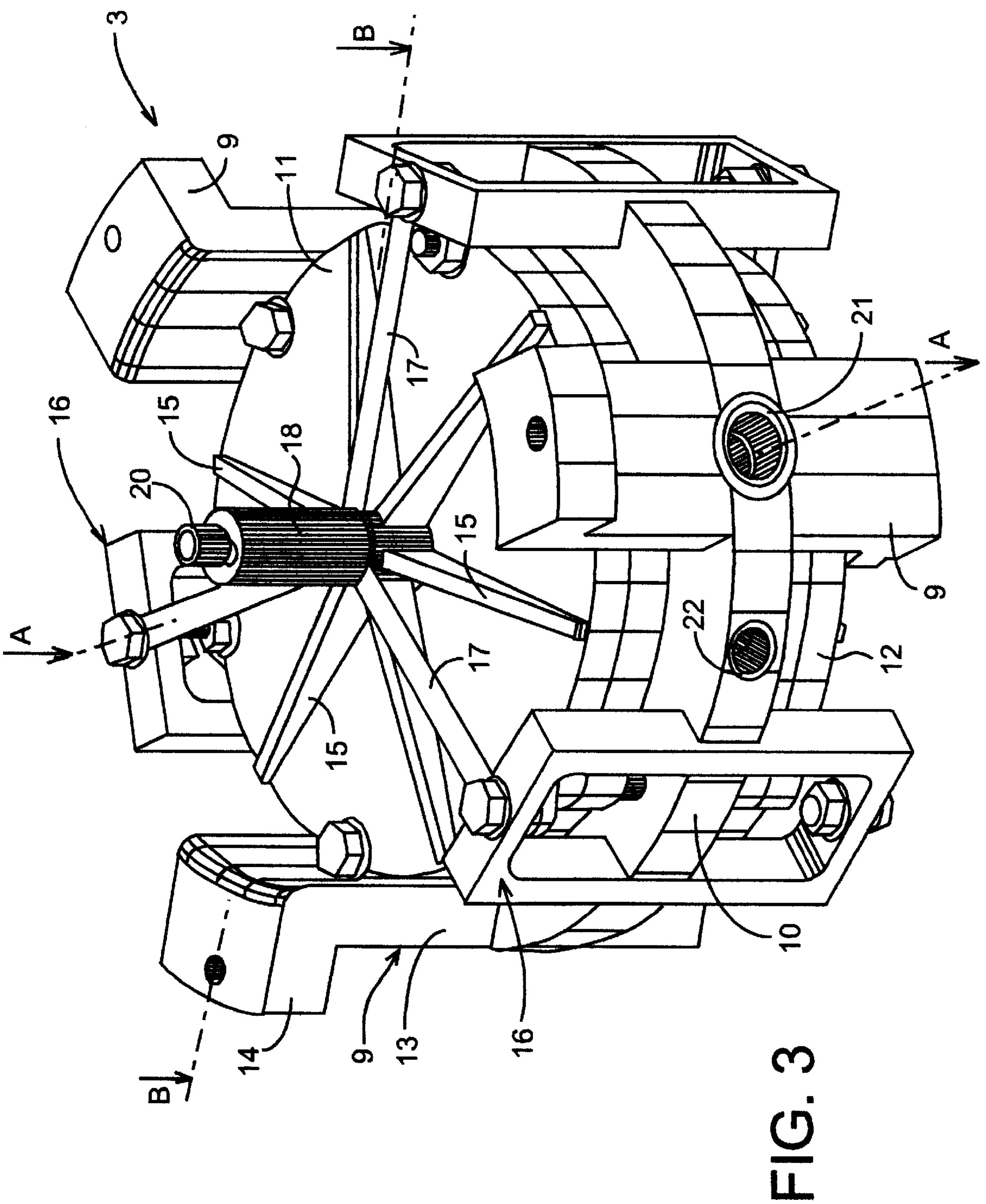
FIG. 3 is an overall view of the support jack.

FIG. 3 is an overall perspective view of the generally cylindrical jack 3 having a projecting body 10 to which are mounted feet 9 for affixation to the upper plate 4, covers 11 and 12 being present on either side. Each foot 9 assumes the shape of a right-angle of which the base 13 is integrated into the body 10 and of which the upper arm 14 is perforated to allow screwing it onto the support 2. The Figure shows that the jack 3 is affixed by three feet 9 disposed by 120°. Each cover 11 or 12 is fitted with reinforcing means 15 constituting six braces in star form shape regularly disposed at its free surface. The jack 3 is also fitted with a guide structure consisting of three frames 16 fastened at its center to the support 10 and metal guide membranes 17. These membranes 17 as well as the braces 15 are connected to the central pivot means 18 of each cover. The three frames 16 alternate spatially with the feet 9 and are for instance spaced 120° apart from one another. This guidance structure allows single-axis displacement of the jack along the central pivot means 18 of each cover. The central pivot means 18 is extended by the threaded segment 20 to join the jack to the linkrod connecting it to the load 1. FIG. 3 also shows duct 21 for receiving pressurized fluid and circuit purging duct 22.

Figure 4:
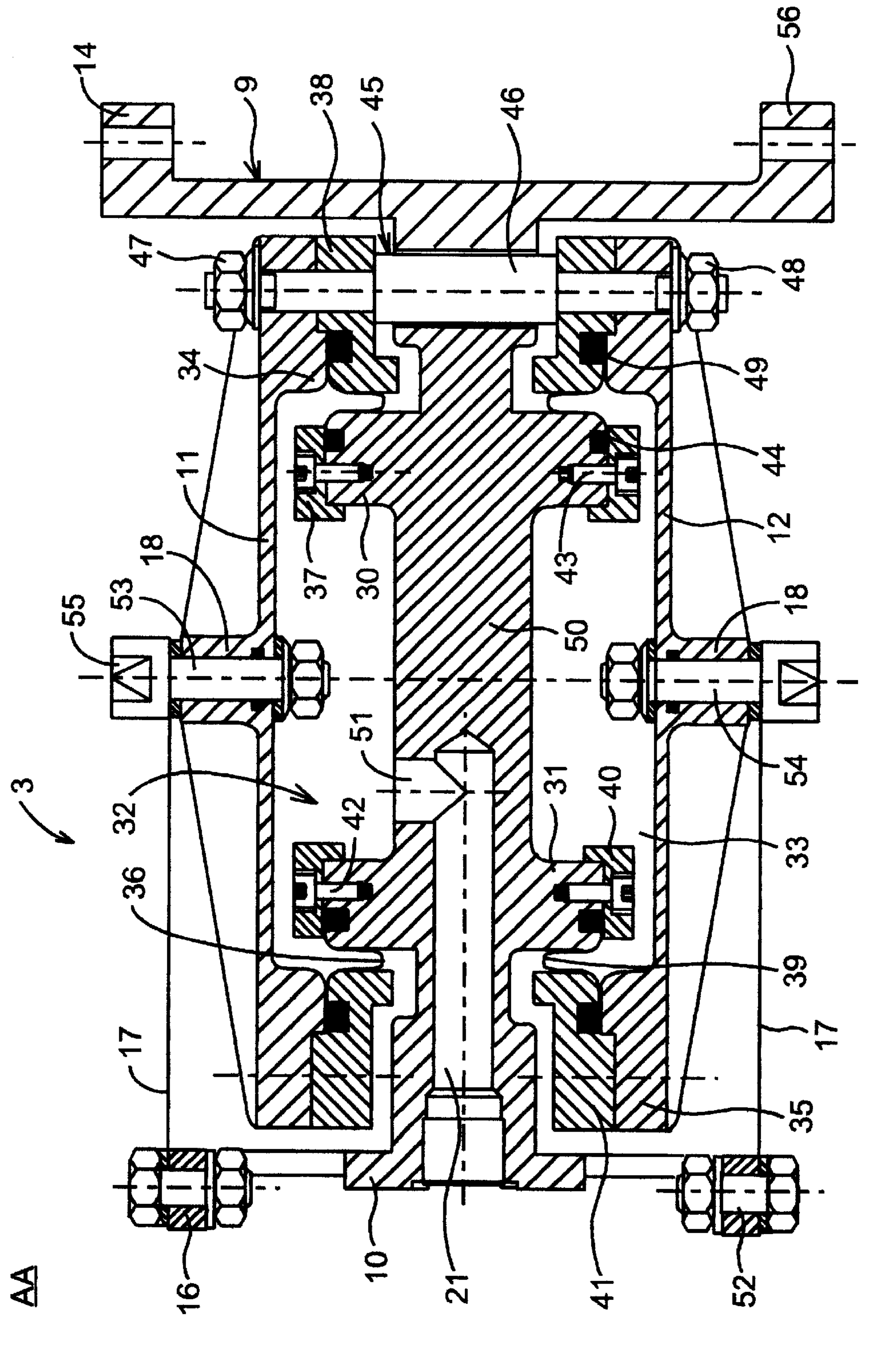
FIGS. 4, 5 are sections AA and BB of FIG. 3.

FIG. 4 shows a section AA of FIG. 3 and the inner configuration of the jack 3. It shows the body 10 forming a reservoir by means of two generally cylindrical flanges 30 and 31 which together with the covers 11 and 12 bound chambers 32 and 33 respectively. The covers 11 and 12 also are fitted respectively with generally cylindrical flanges 34 and 35. Preferably and as shown in the Figure, the flanges 34 and 35 have an inside diameter larger than the outside diameter of the respective flanges 30 and 31. The chamber 32 is sealed by a flexible membrane 36 applied against flanges 30 and 34 by means of respective collars 37 and 38. Similarly a flexible membrane 39 applied against the opposite flanges 31 and 35 by the respective collars 40 and 41 ensures sealing the chamber 33. Each membrane 36 or 39 may extend into a loop to ease its mobility. The collar 37 is affixed to the flange 30 by a given number of screws 42 regularly arrayed along its circumference. The same design applies to the collar 40 affixed to the flange 31 by the screws 43. The collars 37 and 40 clamp the outer edges of the membranes 36 and 39 and, in order to completely seal the chambers 32, 33, the flanges 30 and 31 each are fitted with a channel into which a membrane bead 44 is inserted. The collars 38 and 41 are forced against the respective flanges 34 and 35 by a set of tie bolts 45 having a bulge 46 at a central segment thereof and at the sides of which are applied the collars 38 and 41. Thereupon the covers 11 and 12 are fastened to the collars 38 and 41 by the nuts 47 and 48 screwed onto the ends of the bolts 45. In the same manner, the inner edge of each membrane 36 or 39 may comprise a bulge 49 entering a channel in each of these collars 38 and 41 to effect the necessary sealing. FIG. 4 also shows that the bolts 45 pass through all the core 50 with some play allowing free sliding through the jack body 10.

The chamber 32 is fed with pressurized fluid through the channel 21 extended by a conduit 51 opening into chamber 32.

FIG. 4 also shows the bolts 52 affixing the blades 17 to the frame 16, the bolts 53 and 54 affixing the blades 17 to the central pivot means 18 of the covers 11 and 12. Each bolt 53 or 54 comprises on the outside a double flat 55 to allow nut tightening. Also shown is the other arm 56 of the foot 9 illustratively serving to affix an active jack (not shown here) which will generate an additional thrust on the bolt 54 and thereby on the jack 3.

Figure 5:
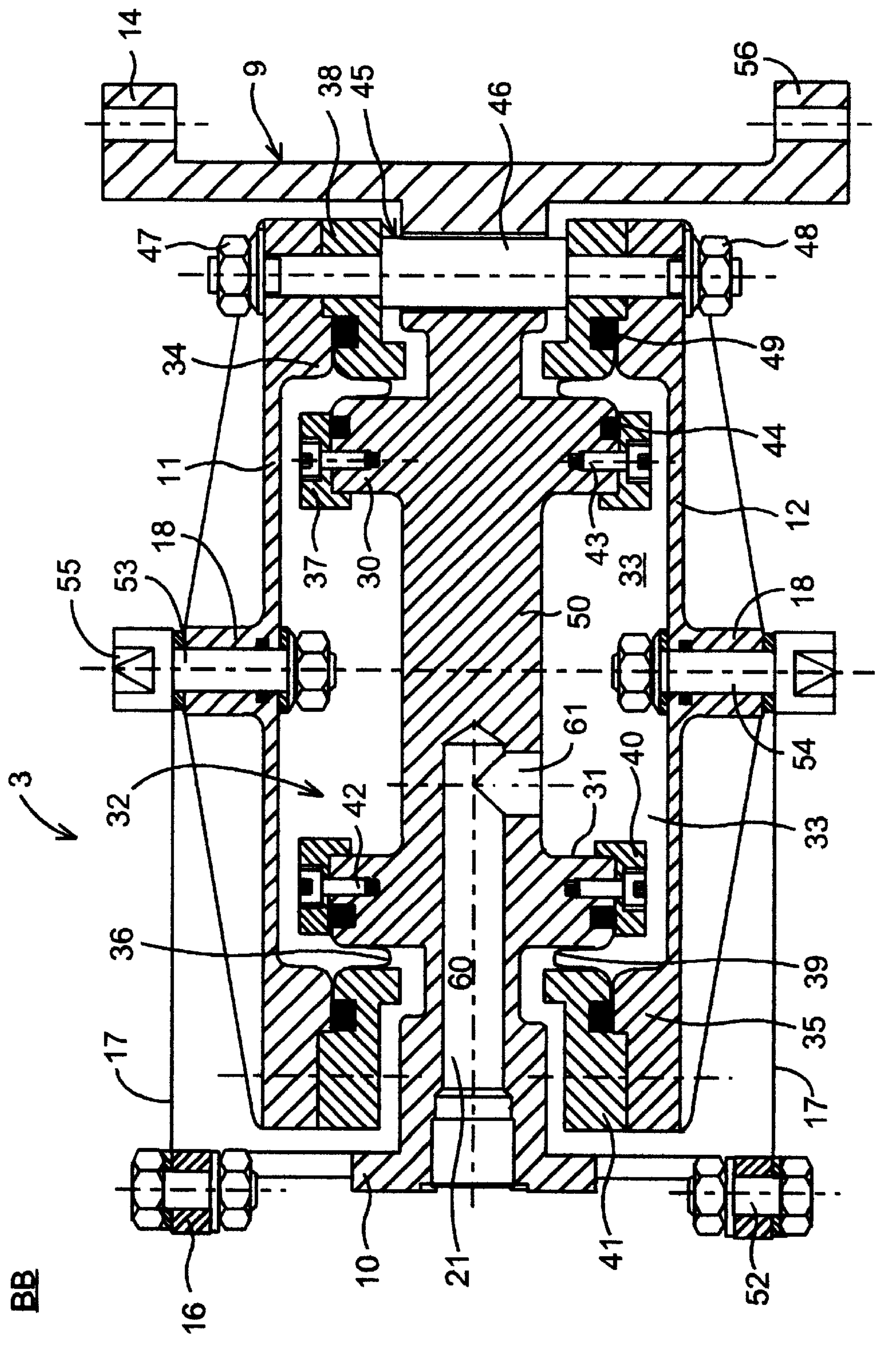

FIG. 5 is a section along BB of FIG. 3 and shows the fluid-intake duct 60 to feed the chamber 33 and opening there into via conduit 61. It must be borne in mind that the chamber 33 is fitted with another (not shown) duct for purging.

Operation is as follows. Initially the jack 3 is fed with fluid through the chamber 32 and the duct 21, any air being expelled through the duct 22. The support jacks 3 and 6 take commensurate mirror loads with only slight errors:

for each set of jacks 3 and 6, the error caused by the slight residual rigidity of these jacks is less than 15N for displacements as high as 1.5 mm.

error due to any form of hysteresis is less than 1N for displacements up to 0.6 mm.

To allow this perfect distribution of the mirror weight, the pressure differential caused by the altitude differential between the support jacks must be compensated. For that reason the jacks are dual-acting, the interconnected chambers 33 compensating altitude effects.

In general it is necessary to slightly deform the mirror to correct its shape or to match it to various observational modes. For that purpose the support jack 3 allows adding a force generated by an active jack. This active jack is denoted by element 7 in FIG. 1 and is coupled to the support jack by its lower feet 56 and exerts a force on the axis 54. The support jack 3 allows transmitting this force without affecting it. Typically, this force varies from 0 to ±800N, and is transmitted with an error of less than 0.05N for the minute conventional displacements of telescope mirrors.

I claim:

1. A dual-acting support jack interposed between a support and a load, and able to exert on the load a rated force between approximately 400 to 3900N over displacements of less than 1 cm, comprising: a reservoir-forming body linked to the support and the load and covered on each side by first and second covers, respectively, the first cover and the body bounding a first chamber, and the second cover and the body bounding a second chamber, each chamber being sealed by a flexible membrane, and the covers being connected to each other by link means.

2. The support jack of claim 1, wherein the link means are tie bolts traversing the body and the covers.

3. The support jack of claim 1, wherein the support jack has an overall cylindrical shape and the two chambers are isolated one from the other.

4. The support jack of claim 3, wherein the membranes are ring-shaped and have an inside edge connected to the body and an outside edge connected to each of the covers.

5. The support jack of claim 4, wherein the body comprises a cylindrical flange located on either side of a central core cooperating with a collar to clamp the inside edge of each of the membranes.

6. The support jack of claim 3, wherein each cover comprises a cylindrical flange cooperating with a collar to clamp the outside edge of each membrane.

7. The support jack of claim 6, wherein the covers are interlinked by tie bolts having at a middle thereof a bulge against either side of which the collar and covers are compressed by means of a nut.

8. The support jack of claim 5, wherein the inner and outer edges of the membranes are fitted with a bead insertable into a channel in each collar.

9. The support jack of claim 1, wherein the load is linked to one of the covers by a linkrod.

10. The support jack of claim 1, further comprising means for applying an additional force supported opposite the load.

11. The support jack of claim 1, wherein a movable part of the jack composed of the covers is guided by thin metal blades connecting the covers to the body.

12. The support jack of claim 1, wherein the support jack suspends a telescope mirror.

13. A plurality of support jacks as claimed in claim 11, arranged in an array and linked to the mirror and to a support structure matching the shape of the mirror.

* * * * *